United States Patent
Tanaka et al.

(10) Patent No.: US 9,595,399 B2
(45) Date of Patent: Mar. 14, 2017

(54) SOLID-STATE ION CAPACITOR

(71) Applicants: TDK CORPORATION, Tokyo (JP); ENERGY STORAGE MATERIALS LLC, Fujisawa, Kanagawa (JP)

(72) Inventors: Teiichi Tanaka, Tokyo (JP); Takeo Tsukada, Tokyo (JP); Takaaki Tsurumi, Fujisawa (JP)

(73) Assignees: TDK CORPORATION, Tokyo (JP); ENERGY STORAGE MATERIALS LLC, Kanagawa (JP)

( * ) Notice: Subject to any disclaimer, the term of this patent is extended or adjusted under 35 U.S.C. 154(b) by 326 days.

(21) Appl. No.: 14/282,409

(22) Filed: May 20, 2014

(65) Prior Publication Data
US 2014/0340821 A1    Nov. 20, 2014

(30) Foreign Application Priority Data

May 20, 2013  (JP) .................................. 2013-106259
May 20, 2014  (JP) .................................. 2014-104000

(51) Int. Cl.
H01G 9/155    (2006.01)
H01G 11/56    (2013.01)
H01G 4/30     (2006.01)
H01G 11/12    (2013.01)
H01G 4/12     (2006.01)
B32B 18/00    (2006.01)
(Continued)

(52) U.S. Cl.
CPC ............. *H01G 11/56* (2013.01); *B32B 18/00* (2013.01); *C04B 35/447* (2013.01); *C04B 35/484* (2013.01); *H01G 4/1236* (2013.01); *H01G 4/30* (2013.01); *H01G 11/12* (2013.01); *C04B 2235/3203* (2013.01); *C04B 2235/3217* (2013.01); *C04B 2235/3227* (2013.01); *C04B 2235/3232* (2013.01); *C04B 2235/441* (2013.01); *C04B 2235/6025* (2013.01); *C04B 2235/652* (2013.01); *C04B 2235/6567* (2013.01); *C04B 2235/6582* (2013.01); *C04B 2235/764* (2013.01); *C04B 2235/782* (2013.01); *C04B 2235/784* (2013.01); *C04B 2235/786* (2013.01); *C04B 2237/348* (2013.01); *Y02E 60/13* (2013.01)

(58) Field of Classification Search
CPC ....................................................... H01G 11/56
USPC ....................................................... 361/502
See application file for complete search history.

(56) References Cited

U.S. PATENT DOCUMENTS 4,977,007 A * 12/1990 Kondo .................. G02F 1/1525
                                                    264/104
2008/0117563 A1    5/2008 Nagata et al.
(Continued)

FOREIGN PATENT DOCUMENTS

JP    A-2008-130844    6/2008
WO    WO 2013/111804 A1    8/2013

*Primary Examiner* — Eric Thomas
(74) *Attorney, Agent, or Firm* — Oliff PLC

(57) ABSTRACT

The present invention provides a solid-state ion capacitor. In the solid-state ion capacitor, the particle number in the thickness direction of the solid electrolyte sandwiched between the electrodes was at least 1 and the average particle number was 80 or less. Further, the solid electrolyte includes particles with D10~D90 in the particle diameters of particle size distribution of 0.5 μm or more and 100 μm or less.

12 Claims, 2 Drawing Sheets

(51) Int. Cl.
*C04B 35/447* (2006.01)
*C04B 35/484* (2006.01)

(56) References Cited

U.S. PATENT DOCUMENTS

2014/0065513 A1* 3/2014 Badding ................ C25B 13/04
  429/492
2014/0308590 A1* 10/2014 Ohta ..................... H01B 1/122
  429/403

* cited by examiner

Dielectric relaxation frequency

SOLID-STATE ION CAPACITOR

The present invention relates to a solid-state ion capacitor, especially a solid-state ion capacitor in which a solid electrolyte is used for electricity storage.

BACKGROUND

With the spread of the electronic devices such as mobile phone, notebook PC, digital camera and the like, researches and developments of various electricity storage devices as the electronic components of the electronic devices have been actively conducted.

In this respect, an all-solid-state electric double-layer capacitor comprising a solid electrolyte and a current collector in which the solid electrolyte is an inorganic solid electrolyte, has been proposed in Patent Document 1.

In patent document 1, a solid electrolyte composed of inorganic compound is used to avoid the liquid leaking, since there is possibility that deterioration caused by liquid leak will happen if a liquid electrolyte (electrolyte solution) is used in the electrolyte of the electric double-layer capacitor.

PATENT DOCUMENTS

Patent Document 1: JP-A-2008-130844

SUMMARY

In Patent Document 1 described above, the application is supposed to be a device for electricity storage in which the energy charging and discharging is required to be quicker than that in secondary batteries, which is the same application as that of the conventional electric double-layer capacitor. For example, it can be charged in a large current generated in a regenerative braking of EV or in a peak power generation of the solar power generation or wind power generation with less loss than secondary batteries.

On the other hand, the electric double-layer capacitor is inferior with a lower dielectric relaxation frequency when compared with ceramic capacitors or electrolytic capacitors. Thus, it is difficult to be used as a coupling device or a de-coupling device.

Dielectric relaxation frequency is in proportion to the reciprocal number of the product of the internal resistance and the capacitance of the device. Thus, the internal resistance should be lowered or the capacitance should be decreased in order to increase the dielectric relaxation frequency. In one hand, as a device for electricity storage, the capacitance is preferred to be larger. Therefore, it becomes important to lower the internal resistance of the device in increasing the dielectric relaxation frequency.

The present invention has been achieved in view of the problems mentioned above. It is an object of the present invention to increase the dielectric relaxation frequency of the solid-state ion capacitor.

The solid-state ion capacitor of the present invention is characterized in that the particle number in the thickness direction of the solid electrolyte sandwiched between the electrodes is at least one and the average particle number is 80 or less.

If the average particle number is more than 80, the resistance component in the grain boundaries will increase, resulting in a decrease in the ionic conductivity, thus the dielectric relaxation frequency will decrease. The dielectric relaxation frequency affects the frequency dependence of the capacitance of the capacitor, and if the dielectric relaxation frequency is below 0.1 kHz, it can no longer be used as a capacitive element of decoupling and coupling in the circuit. On the other hand, with such a configuration that the particle number is at least one and the average particle number is 80 or less, the resistance component in the grain boundaries can be suppressed, thereby the ionic conductivity and the dielectric relaxation frequency can be increased.

In addition, in the solid electrolyte of the present invention, it is preferable that the particle size of D10~D90 in the particle size distribution is included within the range of 0.5 μm or more and 100 μm or less.

If the particle diameter D10 in the particle size distribution in the solid electrolyte is less than 0.5 μm, the whole resistance component is more likely to be dominated by the resistance component from the grain boundaries of the fine particles, and the whole resistance component will be increased. On the other hand, in the particle size distribution such that D90 is greater than 100 μm, a lot of particles with a size larger than 100 μm will be contained, and the intragranular resistance component from the large particles will give a large influence. In any cases, the ionic conductivity will decrease, and the dielectric relaxation frequency will be lowered due to the increase of the resistance of the solid electrolyte. Further, the variation in the dielectric relaxation frequency due to individual differences of the solid-state ion capacitor can be suppressed, and solid-state ion capacitor with uniform properties can be produced.

In addition, the solid electrolyte of the present invention preferably contains lithium ion conductive compounds.

Thereby, the dielectric relaxation frequency can be increased by using solid electrolyte with high ionic conductivity at ordinary temperature.

In addition, the solid electrolyte of the present invention preferably contains lithium ion conductive compounds with Garnet type crystal structure, and the lithium ion conductive compounds preferably contain at least Li, La, Zr and O.

Thereby, since it is possible to be sintered under reducing atmosphere, the solid electrolyte and the electrodes can be sintered simultaneously, and it becomes easy to simplify the process.

In addition, the solid-state ion capacitor of the present invention is preferably constituted by laminating a plurality of the solid electrolytes and the electrodes alternately.

Thereby, the solid-state ion capacitor can have a laminated structure similar to the laminated ceramic capacitor, and a solid-state ion capacitor which is small in size and have a large capacitance can be easily obtained.

It is possible to increase the dielectric relaxation frequency of the solid-state ion capacitor in the present invention, by controlling the particle number in the thickness direction of the solid electrolyte sandwiched between the electrodes to be at least one and the average particle number to be 80 or less.

DETAILED DESCRIPTION OF EMBODIMENTS

Hereinafter, the preferable embodiments of the present invention will be described with reference to the drawings. In addition, the invention is not limited to the embodiments described as follows. The components described below include those can be thought of easily by those skilled in the art or those are substantially the same. In addition, the components described as follows can be combined properly.

<Embodiment 1>

Figure 1:
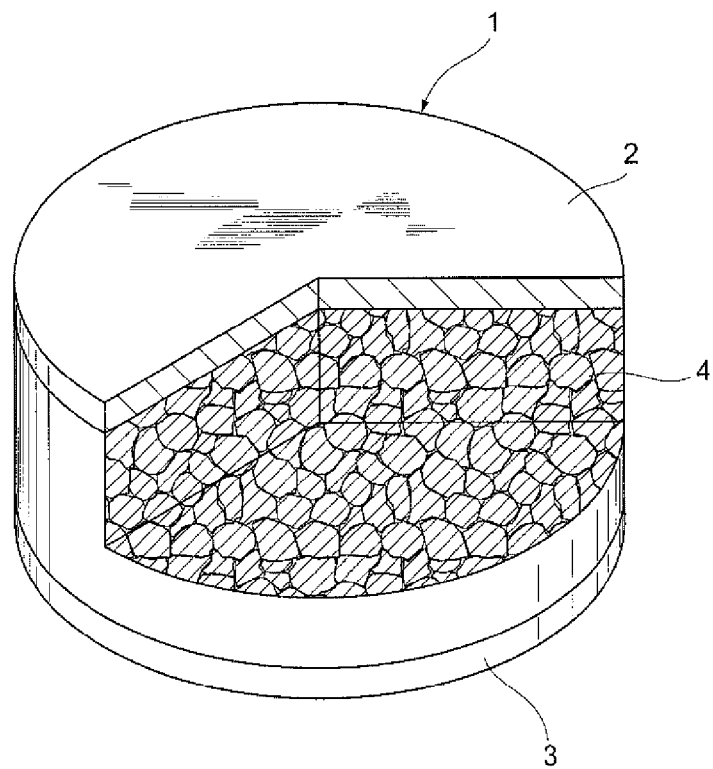
FIG. 1 is a perspective view schematically showing the partially broken state of the solid-state ion capacitor of the embodiment of the present invention.
Figure 2:
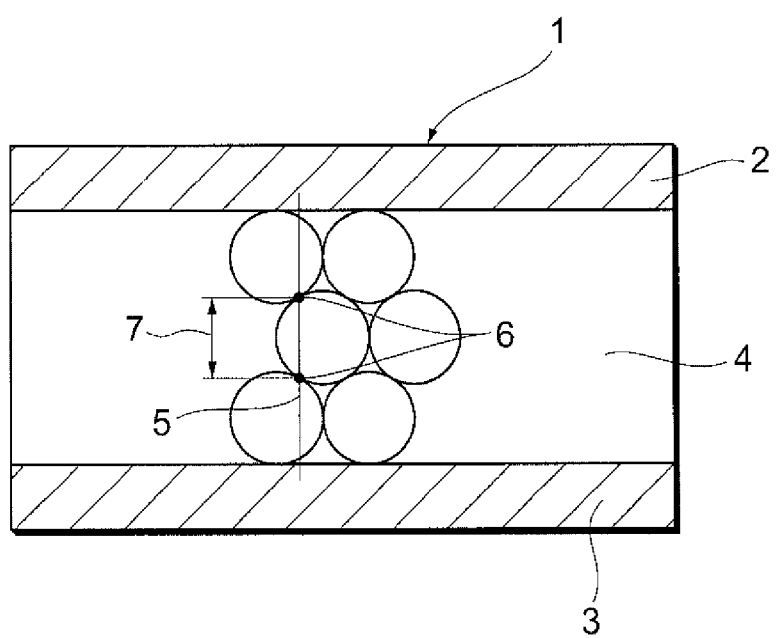
FIG. 2 is a plane view schematically showing the cross section of the solid-state ion capacitor of the embodiment of the present invention.

FIG. 1 is a perspective view schematically showing the partially broken state of the solid-state ion capacitor of the embodiment of the present invention. In addition, FIG. 2 is a plane view schematically showing the cross section of the solid-state ion capacitor of the embodiment of the present invention. The solid-state ion capacitor 1 of the embodiment of the present invention includes solid electrolyte 4 sandwiched between the electrodes. In addition, the electrodes are formed as an anode 2 and a cathode 3 on both major surfaces of the solid electrolyte 4. The outer shape of the solid-state ion capacitor 1 of the embodiment of the present invention is not limited to be a disk shape as shown in the figures, and may also be a rectangular plate shape.

In the solid electrolyte 4, specific ions move in the solid, and other ions form the crystal lattice thus do not move easily. That is, when a voltage is applied between the anode 2 and the cathode 3, specific ions move in the solid electrolyte 4 while other ions do not move from the crystal lattice easily.

For example, when the compound contains Li, Ti, P and O with a Nasicon-type crystal structure or contains Li, La, Zr and O with a Garnet-type crystal structure, the specific ions are Li ions. Or the specific ions are Na ions if the compound contains Na, Zr, P and O with a Nasicon-type crystal structure. In addition, as for the other ions, they represent the ions other than Li ions or Na ions contained in the compound of the solid electrolyte 4. In the solid electrolyte 4 with a Nasicon-type crystal structure shown in the above example, the other ions are Ti, P and O, or Zr, P and O in the compound, while in the solid electrolyte 4 with a Garnet-type crystal structure they are La, Zr and O in the compound.

In the solid electrolyte 4 sandwiched between the electrodes (i.e., the anode 2 and the cathode 3), the average particle number in the thickness direction is 1 or more and 80 or less. Preferably, it is better that the average particle number in the thickness direction is less. It is because that if the average particle number is larger than 80, the dielectric relaxation frequency will become small and the response to the charge move will deteriorated. Physically, the average particle number can not be less than 1.

This is because that the less the average particle number in the thickness direction of the solid electrolyte 4 sandwiched between the anode 2 and the cathode 3 of the solid-state ion capacitor 1 is, the less the number of grain boundaries is, and the resistance component in the grain boundaries will decrease. Thus, both the ionic conductivity and the dielectric relaxation frequency become high. In this respect, the increase of the dielectric relaxation frequency means that the charging and discharging can be performed more rapidly, which has the same meaning as that the rate of the charging and discharging of the solid-state ion capacitor 1 becomes higher.

Herein, the average particle number of the solid electrolyte 4 sandwiched between the electrodes (i.e., the anode 2 and the cathode 3) is calculated as follows. The solid-state ion capacitor 1 is buried in resin. Then the side that is perpendicular to the electrode faces of the anode 2 and the cathode 3 is polished so as to be a surface, and then it is chemically etched with dilute hydrochloric acid. Then the cross section is observed by SEM. As shown in FIG. 2, a perpendicular line 5 is drawn in the cross section image, wherein, the perpendicular line 5 connects the anode 2 and the cathode 3 on the opposite ends of the solid electrolyte 4 sandwiched between the opposite anode 2 and cathode 3. The particle number in the thickness direction is obtained by adding 1 to the number of the intersection points 6 of the perpendicular line 5 with the grain boundaries of the solid electrolyte 4. 10 lines of perpendicular line 5 are arbitrarily drawn in the same way. And the average of the numbers obtained is determined to be the average particle number sandwiched between the electrodes.

In addition, in the solid electrolyte 4, D10~D90 in the particle diameters of particle size distribution is in the range of 0.5 μm or more and 100 μm or less.

It is because that the resistance component in the grain boundaries will increase if solid electrolyte 4 containing many particles finer than 0.5 μm is prepared, and the resistance component in the grains will increase if solid electrolyte 4 containing many particles bigger than 100 μm is prepared. In both cases, the ionic conductivity of the solid electrolyte 4 will decrease, and the dielectric relaxation frequency property will decrease.

Herein, the particle size distribution is determined from the particle size calculated by a code method. Specifically, on the lines drawn to calculate the average particle number mentioned above (i.e., the perpendicular line 5 connecting the electrodes on the opposite ends of the solid electrolyte 4 sandwiched between the electrodes on the cross section image), the value obtained by multiplying the length 7 of the section separated by the intersection points 6 with the grain boundaries to 1.62 is determined as particle diameter, and the particle size distribution is obtained. In the cumulative distribution of the particle size distribution obtained, the 10% cumulative particle diameter D10 and the 90% cumulative particle diameter D90 are obtained.

Although the materials for forming the solid electrolyte 4 are not particularly limited as long as they are ionic conductive compounds in which the ions move in the solid electrolyte 4, those having a Garnet type crystal structure are preferred. The Garnet type crystal structure has big spaces in the crystal structure, and Li ions can move easily while the movement of the other ions is difficult. As for the other ions, ions containing at least La, Zr, and O as the elements which are less susceptible in valence variation are preferably used, by which the dielectric relaxation frequency can be increased.

In addition, as for the solid electrolyte 4, glass components such as $SiO_2$ or $Bi_2O_3$ and the like are preferably added. A better chemical stability against water can be shown and the moisture absorption resistance can be increased by containing the glass component.

As for the electrode materials used in anode 2 and cathode 3, there is no particular limit. However, non-valve action materials which do not have valve action, such as noble metal materials like Au, Pt, Pd, and the like, transition metal materials like Ni, Cu, Cr, Mn, Fe, Co and the like can preferably be used, and oxide materials or semiconductor materials such as SiC and the like can also be used.

However, valve action metals having valve action, such as Al, Ti, Ta, Nb or alloys containing these metals and the like may form an insulating layer easily in the interface between anode 2 or cathode 3 and solid electrolyte 4 when preparing the solid-state ion capacitor 1. Thus it may cause the decrease of capacitance. Therefore, these materials are not preferable.

In addition, it is also preferred that the interface between solid electrolyte 4 and anode 2 or cathode 3 is roughened by having micro uneven structures. Thereby the electrode area is increased, so the capacitance of the solid electrolyte 4 can be further increased. In addition, as the solid electrolyte 4 is a sintered body formed through a sintering treatment described as follows, the surfaces have some degree of uneven structures after sintered. Thus the interfaces mentioned above can easily be formed to micro uneven structures, by forming anode 2 or cathode 3 after a polishing process is applied so that the surfaces of the sintered body have uneven structures, or by forming anode 2 or cathode 3 without polishing the sintered body. In addition, both of the major faces of the solid electrolyte 4 can also have micro uneven structures through proper etching and the like.

Herein after, the preparation method of the solid-state ion capacitor is described as follows.

First, a predetermined amount of raw materials are weighed and mixed. For example, when the Li ionic conductive compounds to be prepared have Garnet-type crystal structures containing Li, La, Zr and O, Li compounds such as $Li_2CO_3$ or $LiNO_3$ and the like, La compounds such as $La_2O_3$ or $La(OH)_3$ and the like, or Zr compounds such as $ZrO_2$ or $Zr(OH)_4$ and the like are prepared as raw materials. And predetermined amount of these materials are weighed and mixed to obtain a mixture.

Then, the mixture is applied to a heat-treatment under a specific heat-treatment profile to prepare Li ion conductive compounds.

In addition, when the glass component is contained in the Li ion conductive compounds, it is preferred that a predetermined amount of glass materials containing Si compounds such as $SiO_2$ or $Li_4SiO_4$ and the like are weighed and mixed with the raw materials mentioned above. After heated and melted, the mixture is quenched to vitrify. After that, heat treatment is performed under the heat treatment profile mentioned above, and the Li ion conductive compounds are prepared.

Then the Li ion conductive compounds are wet-pulverized and then binder, solvent, and plasticizer and the like are added and applied to a sufficient wet-mix to obtain slurry. Then the slurry is dried and granulated, press molded to a pellet shape and the like, and a molded body is obtained.

The binder, solvent, plasticizer and the like are not particularly limited. For example, polyvinyl butyral resin or acrylic resin and the like can be used as binder, n-butyl acetate or ethanol and the like can be used as solvent, and dibutyl phthalate or butyl benzyl phthalate and the like can be used as plasticizer.

After that, the molded body is sintered in the condition of sintering temperature being 500□~1350□ and sintering time being 2 hours~50 hours, by which the solid electrolyte 4 is prepared.

Next, as for the electrode materials, non-valve action materials which do not have valve action are preferred. For example, noble metal materials such as Au, Pt, Pd and the like, transition metal materials such as Ni, Cu, Cr, Mn, Fe, Co and the like, oxide materials or semiconductor materials such as SiC and the like are prepared. The anode 2 and the cathode 3 are formed on the two major faces of the solid electrolyte 4 by using the electrode materials.

In addition, the forming method of the anode 2 and the cathode 3 are not particularly limited. For example, any method selected from film-forming methods such as sputtering method or vacuum vapor deposition method and the like, coating method in which paste is coated and baked, plating methods such as electroplating and the like, and thermal spraying method and the like, can be used.

Further, the solid-state ion capacitor 1 of the embodiments of the present invention can be laminated. Thereby the solid-state ion capacitor can be a laminated structure which is similar to a laminated ceramic capacitor and a solid-state ion capacitor with a small size and a larger capacitance can be obtained easily. This kind of structure will be shown in detail in embodiment 2 herein after.

<Embodiment 2>

Figure 3:
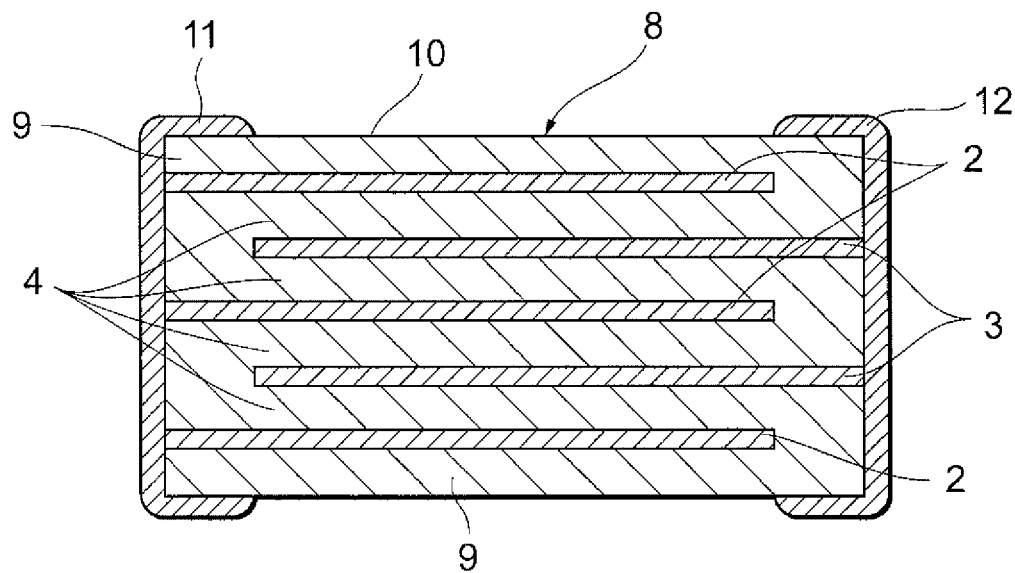
FIG. 3 is a plane view schematically showing the cross section of the laminated type solid-state ion capacitor of another embodiment of the present invention.

FIG. 3 is a plane view schematically showing the cross section of the laminated type solid-state ion capacitor of another embodiment of the present invention. In the present embodiment, the solid-state ion capacitor has a laminated structure.

In FIG. 3, in the laminated solid-state ion capacitor 8, the anode 2 and the cathode 3 are laminated alternatively with solid electrolyte 4 sandwiched there between, in the way of forming anode (the first electrode) 2 on one major face of the solid electrolyte 4, and forming cathode (the second electrode) 3 on the other major face. That is, in FIG. 3, 4 layers of anode 2 and 3 layers of cathode 3 are laminated alternatively by sandwiching 6 layers of solid electrolyte 4. In addition, in FIG. 3, in the upper layer side of the anode 2 on the topmost and in the lowest lower layer side of the anode 2, outer packing 9 made of the same material as solid electrolyte 4 are provided respectively. An element body 10 is formed by the solid electrolyte 4, anode 2, cathode 3 and outer packing 9. Then a first outer electrode 11 and a second outer electrode 12 are formed on both ends of the element body 10, with the first outer electrode 11 connected with anode 2 electrically, and the second outer electrode 12 connected with cathode 3 electrically.

In this way, in the laminated solid-state ion capacitor 8, a plural of the anode 2 and the cathode 3 are laminated alternatively with solid electrolyte 4 sandwiched there between, by forming anode 2 on one major face of the solid electrolyte 4 and cathode 3 on the other major face. Thereby a solid-state ion capacitor with a laminated structure which is similar to a laminated ceramic capacitor and with a small size and a larger capacitance can be obtained easily. Especially, the area of the electrodes can be increased by forming the interfaces of the solid electrolyte 4 and the anode 2 or the cathode 3 with micro uneven structures. Thus, a solid-state ion capacitor in which the capacitance is increased tremendously while the solid electrolyte 4 becomes thinner can be obtained.

Next, the preparation process of the laminated type solid-state ion capacitor is described as follows.

First, ion conductive compounds are prepared with the same method and order as the solid-state ion capacitor 1 of the embodiment 1 mentioned above.

Then, the ion conductive compounds are sufficiently wet-pulverized, and then binder, solvent, and plasticizer and the like are added and applied to a wet-mix to obtain slurry. Then the slurry is molded to prepare a green sheet using doctor blade method and the like.

Next, the same electrode materials as the solid-state ion capacitor 1 of the embodiment 1 mentioned above, preferably electrode paste containing non-valve action materials which do not have valve action, are prepared. The electrode paste is printed on the prepared green sheet containing the ion conductive compounds to form a film coated with a predetermined pattern. After that, a green sheet without forming a coated film is placed as the lowest layer, and the green sheets formed with films which are coated with predetermined patterns are laminated thereon. In this step, several films coated with predetermined patterns are appropriately laminated so as to overlap alternatively in the predetermined direction with solid electrolyte 4 sandwiched between. In addition, the films coated with predetermined patterns to be anode 2 and the films coated with predetermined patterns to be cathode 3 are laminated alternatively so as to shift with a predetermined pitch. At last, a green sheet without forming a coated film is placed as the topmost layer, and the laminated molded body is prepared by heating and pressing. The laminated molded body here has a size of about 60 mm square to 200 mm square with the layer number of the solid electrolytes 4 in which electrodes are sandwiched being 1 layer to 1000 layers.

Then the laminated molded body is cut into a predetermined size of about 0.2 mm×0.1 mm×0.1 mm to 32 mm×16 mm×16 mm with one end of the anode 2 and the other end of the cathode 3 exposed in the opposite end faces. Then it is put in a box (saggar) to be sintered at the temperature of about 900□ to 1300□, and the element body 10 with the solid electrolytes 4 and the anode 2 or the cathode 3 laminated alternatively is obtained.

Then commercially available paste for outer electrode such as Ag—Zn electrode paste or Al electrode paste is prepared. The paste for outer electrode is coated on the two opposite end sides on which the anode 2 and the cathode 3 of the element body 10 are exposed. Next, the first outer electrode 11 and the second outer electrode 12 are formed by sintering at a temperature of about 400□ to 800□. The first outer electrode 11 is connected with anode 2 and the second outer electrode 12 is connected with cathode 3. Then a laminated solid-state ion capacitor 8 with a laminated structure can be prepared easily by using a manufacturing method similar to that of the laminated ceramic capacitor as has been shown so far.

In addition, the present invention is not limited by the embodiments illustrated above. And obviously, it is possible to modify without departing from the spirit.

Herein after, examples of the present invention are illustrated specifically.

EXAMPLES

In this example, a solid-state ion capacitor was prepared by controlling the average particle number in the thickness direction of the solid electrolyte sandwiched between the electrodes. The dielectric relaxation frequencies were shown in the case of changing the average particle numbers in the thickness direction of the solid electrolytes sandwiched between the electrodes.

Example 1

First, the preparation process of the sample in Example 1 is illustrated.

$Li_2CO_3$, $La(OH)_3$, and $ZrO_2$ were prepared as raw materials, predetermined amount of these materials were weighed to obtain a composition of resulted Li ion conductive compound being $Li_7La_3Zr_2O_{12}$, and a mixture was obtained thereby.

Next, the mixture was heated under atmospheric ambient to 900□, and maintained for 5 hours. After that, the mixture was cooled naturally, and the Li ion conductive compound was obtained.

In addition, $Li_7La_3Zr_2O_{12}$ was a Li ion conductive compound with a Garnet-type crystal structure.

Next, the obtained Li ion conductive compound was wet-pulverized. Then it was dried and then binder was added to obtain particles.

The obtained particles were molded into cylindrical shape of $\phi 80$ mm×10 mm, then heated to 1200□ under atmospheric ambient. After maintained for 4 hours, the particles were cooled naturally, and a target of the Li ion conductive compound was obtained.

Next, 18 mm×20 mm of Au with a thickness of 100 nm was vacuum evaporated on a mica substrate which is cut to a size of 20 mm×20 mm with a thickness of about 100 μm. Then 5 hours of annealing treatment was performed under 550° C. under atmospheric ambient to prepare a Au/mica substrate.

Next, radio-frequency magnetron sputtering method was used to form a 15 mm×15 mm film of Li ion conductive compound on the Au/mica substrate using Li ion conductive compound as the target, in the condition of the chamber being Ar atmosphere and the atmospheric pressure being 2.5 Pa while the output of RF being 50 W. When the thickness of the Li ion conductive compound formed on the Au/mica substrate became 1100 nm, the sputtering was stopped and a $Li_7La_3Zr_2O_{12}$u/mica substrate was obtained.

Then $\phi 6$ mm of Au electrode was formed with a thickness of 100 nm by the Au sputtering on the $Li_7La_3Zr_2O_{12}$u/mica substrate to prepare a solid-state ion capacitor.

The dielectric relaxation frequency of the solid-state ion capacitor prepared by the method mentioned above was shown in table 1.

Figure 4:
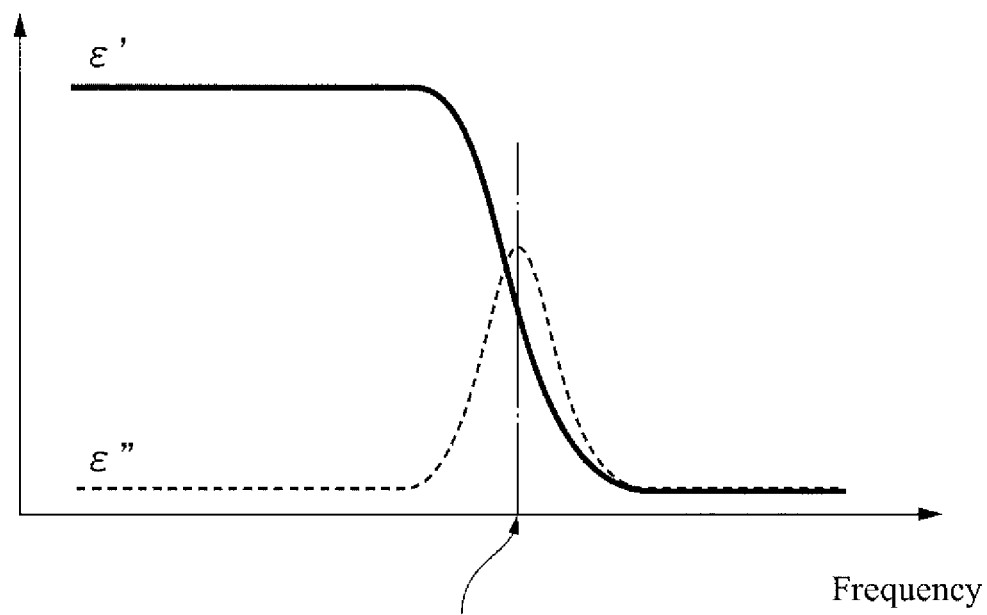
FIG. 4 is a graph showing the frequency characteristic of the impedance of the present invention.

In addition, the samples of which the dielectric relaxation frequency were obtained were set in jigs respectively to measure the frequency properties of the impedance in an impedance analyzer (1260 type, made by Solartron Metrology Corporation) under room temperature in the condition of 1 MHz~0.1 Hz, and a voltage of 100 mV. And the complex permittivity was determined. In this way, as the dash line of the curve of the complex permittivity shown in FIG. 4, from the graph wherein the permittivity was shown in the vertical axis and the frequency was shown in the horizontal axis, the frequency number where the complex permittivity became a peak was determined as the dielectric relaxation frequency. And it was shown in table 1.

In addition, the average particle number in the thickness direction of the solid electrolyte sandwiched in the electrodes was confirmed to be 1. The reason for that was assumed as follows. When XRD was measured in the $Li_7La_3Zr_2O_{12}$ side of the prepared $Li_7La_3Zr_2O_{12}$/Au/mica substrate, peaks could be observed, and it was determined to be crystalline. And the cross section was observed by SEM after the solid-state ion capacitor was buried into resins and polished so that the face perpendicular to the electrode face became the surface, and chemical etching was performed with dilute hydrochloric acid, and no grain boundary was observed.

In addition, D10 and D90 in the particle distribution could not be determined since there was no grain boundary.

Example 2

The preparation process of the sample of Example 2 is illustrated herein after.

In the same way as Example 1, $Li_2CO_3$, $La(OH)_3$ and $ZrO_2$ were prepared as raw materials, predetermined amount of these raw materials were weighed to obtain Li ion conductive compound with a composition of $Li_7La_3Zr_2O_{12}$ and a mixture was obtained thereby.

In addition, $Li_7La_3Zr_2O_{12}$ was a Li ion conductive compound with a Garnet-type crystal structure.

Next, the mixture was heated under atmospheric ambient to 900° C., and maintained for 5 hours. After that, it was cooled naturally, and the Li ion conductive compound was obtained.

Next, the obtained Li ion conductive compound was wet-pulverized. Then binder, solvent, and plasticizer and the like were added and then applied to a sufficient wet-mix to obtain slurry.

Then the slurry was prepared into a green sheet using doctor blade method with the sheet thickness being 30 μm.

After that, 4 layers of the prepared green sheet were laminated and pressed to prepare a molded body of solid electrolyte.

Then, the prepared molded body was cut into 1 cm square, and was sintered under atmospheric ambient with the highest temperature being 1200° C., and maintained for 10 hours. And a sintered body with a thickness of 100 μm was obtained.

After that, φ6 mm of Au electrodes with a thickness of 100 nm was formed by Au sputtering on both sides of the obtained sintered body, and a solid-state ion capacitor was prepared.

The dielectric relaxation frequency of the prepared solid-state ion capacitor was measured in the same way as that in Example 1. In addition, the average particle number in the thickness direction of the solid electrolyte sandwiched between the electrodes was measured. The result was shown in table 1.

Herein, the average particle number in the thickness direction of the solid electrolyte sandwiched between the Au electrodes was measured as follows. The solid-state ion capacitor was buried into resins and polished so that the face perpendicular to the electrode face became the surface, and chemical etching was performed with dilute hydrochloric acid. After these processes, the cross section was observed by SEM. A perpendicular line which connected the electrodes on the opposite two sides of the solid electrolyte sandwiched between the electrodes was drawn in the cross section image. The particle number in the thickness direction was obtained by adding 1 to the number of the intersection points of the perpendicular line with the grain boundaries of the solid electrolyte. 10 lines of perpendicular line were arbitrarily drawn in the same way. And the average of the particle numbers obtained respectively was determined as the average particle number sandwiched between the electrodes and was shown in table 1.

In addition, the particle size distribution was then obtained by calculating the particle diameter of the solid electrolyte sandwiched between electrodes using code method. Code method was a method of calculating particle diameters described as follows. When the surface was observed by microphotograph and the like, a random line was drawn in the observed section. From the number of the intersection points on the line with the grain boundaries, the average length between the grain boundaries was determined. Based on the average length, a value was obtained as the average diameter by multiplying a certain statistic number (Refer to 'Characterization technology of Ceramics', the Journal of the Ceramic Society of Japan, Page 7). In the cumulative distribution of the particle size distribution, the 10% cumulative particle diameter D10 and the 90% cumulative particle diameter D90 were shown in table 1. Specifically, on the lines drawn to calculate the average particle number mentioned above (i.e., the perpendicular line connecting the electrodes on the opposite ends of the solid electrolyte 4 sandwiched between the electrodes on the cross section image), the value obtained by multiplying the length of the section separated by the intersection points with the grain boundaries to 1.62 was determined as particle diameter, and the particle size distribution was obtained.

Example 3

As for Example 3, at first, a molded body was prepared in the same way as Example 2.

Then the prepared molded body was cut into 1 cm square, and was sintered under atmospheric ambient with the highest temperature being 1200° C., and maintained for 8 hours. A sintered body with a thickness of 100 μm was obtained.

Next, as for the prepared sintered body, an electrode was formed by Au sputtering in the same way as that in the sample of Example 2, and then the dielectric relaxation frequency was measured. Then the average particle number between the electrodes, the particle diameter D10 and the particle diameter D90 were calculated. The results were shown in table 1.

Examples 4~9

In Examples 4~9, green sheets were prepared in the same way as Example 2 and Example 3.

Twelve layers of the prepared green sheet were laminated and pressed to prepare a molded body of solid electrolyte.

Then the prepared molded body was cut into 1 cm square, and the sintered time of Examples 4~9 were varied to obtain sintered bodies. Sintered bodies with a thickness of 300 μm were obtained after they were sintered under atmospheric ambient with the highest temperature being 1200° C., and the maintaining time being 10 hours in Example 4, 8 hours in Example 5, 6 hours in Example 6, 4 hours in Example 7, 3 hours in Example 8, and 2 hours in Example 9, respectively.

Next, as for the prepared sintered body, an electrode was formed by Au sputtering in the same way as the samples of Example 2 and Example 3, and then the dielectric relaxation frequencies were measured. Then the average particle numbers between the electrodes, the particle diameter D10s and the particle diameter D90s were calculated. The results were shown in table 1.

Example 10

In Example 10 a laminated type solid-state ion capacitor was prepared.

First, green sheets were prepared in the same way as Example 2~Example 9. Then Ni electrode paste (NP-9920 made by Noritake Co., Ltd.) was prepared, then the Ni electrode paste was printed on the prepared green sheets by screen printing method, and coating films of inner electrode pattern used for 2012 size were formed. Thus green sheets with coating films formed were prepared.

Next, 5 layers of green sheets without coating films formed were provided from the lowest layer as the outer package. Then, 5 layers of green sheets on which coating films were formed were laminated from the sixth layer, in a way that the inner electrodes (the anode and the cathode) were laminated alternatively with green sheets sandwiched there between. Then from the eleventh layer, 4 layers of green sheets without coating films formed were provided as the outer package. And a laminated molded body with Ni inner electrodes was prepared by heating and pressing.

Then the prepared laminated molded body was crush-cut into a size for 2012 size in the way that the anode and the cathode were exposed in different end faces, to obtain a laminated element. After this, the laminated element was put into a box (saggar) and was sintered in a tubular furnace by maintaining for 2 hours under 1150□ in the condition of reducing atmosphere in which a mixed-gas consisted of 2% of $H_2$ and 98% of $N_2$ was run in a speed of 2 L/min.

The end surfaces of obtained sintered body in which the anode and the cathode were exposed were polished by sandblasting. Then InGa electrode was coated and connected with the anode and the cathode to prepare a laminated solid-state ion capacitor for evaluation, and the dielectric relaxation frequency was measured. Then the average particle number between the anode and the cathode, the particle diameter D10 and the particle diameter D90 were calculated. The results were shown in table 1.

Comparative Example 1

In Comparative Example 1, a glass-ceramics based solid electrolyte (LICGC manufactured by OHARA Inc.) with a thickness of 300 μm was used, Au electrode of φ6 mm was formed by Au sputtering, and then the dielectric relaxation frequency was measured. The result was shown in table 1.

In addition, as Comparative Example 1 was glass-ceramics, there were no grain boundary existing. Thus the average particle number between the electrodes and the particle diameters could not be calculated.

Comparative Example 2

Comparative Example 2 was prepared in the same way as the samples of Example 4~Example 9, but the maintaining time of sintering was 1 hour.

On the prepared sintered body, electrodes were formed by Au sputtering in the same way as the samples of Example 2~Example 9, and then the dielectric relaxation frequency was measured. Then the average particle number between the electrodes, the particle diameter D10 and the particle D90 were calculated. The results were shown in table 1.

TABLE 1

|  | Average particle number between the electrodes | Particle diameter D10 [μm] | Particle diameter D90 [μm] | Dielectric relaxation frequency [kHz] |
| --- | --- | --- | --- | --- |
| Example 1 | 1.0 | — | — | 11.9 |
| Example 2 | 2.1 | 48.0 | 93.0 | 7.83 |
| Example 3 | 5.2 | 18.7 | 50.2 | 6.12 |
| Example 4 | 9.3 | 28.7 | 90.1 | 3.62 |
| Example 5 | 15.6 | 15.0 | 49.7 | 3.10 |
| Example 6 | 19.5 | 12.9 | 39.1 | 2.04 |
| Example 7 | 43.5 | 5.8 | 16.3 | 0.76 |
| Example 8 | 61.1 | 4.1 | 11.8 | 0.30 |
| Example 9 | 79.7 | 3.1 | 9.0 | 0.11 |
| Example 10 | 31.2 | 0.6 | 1.8 | 1.31 |
| Comparative Example 1 | — | — | — | 0.08 |
| Comparative Example 2 | 87.9 | 1.6 | 6.1 | 0.07 |

Table 1 showed the average particle numbers between the electrodes, the particle diameter D10s, the particle diameter D90s, and the dielectric relaxation frequencies of the samples of Example 1~Example 10, Comparative Example 1 and Comparative Example 2.

It could be known from table 1 that the less the average particle number between the electrodes was, the higher the dielectric relaxation frequency became. In Example 9, the dielectric relaxation frequency was higher than the glass-ceramics based solid electrolyte of Comparative Example 1 because the particle number between the electrodes was 80 or less. On the other hand, the average particle number between the electrodes of Comparative Example 2 was more than 80 and the dielectric relaxation frequency was lower than Comparative Example 1.

From the description above, it could be known that the dielectric relaxation frequency could be increased than glass-ceramics based solid electrolyte if the particle number between the electrodes was 80 or less.

Examples 11~16

Examples 11~16 were illustrated as follows.

In Examples 11~16, solid-state ion capacitors were prepared using $Li_{1.4}Ti_{1.6}Al_{0.4}(PO_4)_3$ which was a Li ion conductive compound with a NASICON-type crystal structure. $LiNO_3$, $Ti(OC_4H_9)_4$, $NH_4H_2PO_4$ and $Al(NO_3)_3$ were prepared as raw materials. Predetermined amounts of these raw materials were weighed to obtain Li ion conductive compounds with a composition of $Li_{1.4}Ti_{1.6}Al_{0.4}(PO_4)_3$, and mixtures were obtained thereby.

Then the mixture was added into a 0.2M citric acid solution, and were refluxed under 95° C. for 20 hours to react.

Then, ethylene glycol with the same amount of the citric acid solution mentioned above was added, and then the solutions were heated to 170□ under stirring. Water and ethylene glycol were evaporated to obtain dry powders.

Then, the obtained dry powders were heated to 800□ under atmospheric ambient and maintained for 5 hours. After that, they were cooled naturally, and the Li ion conductive compound was obtained.

Next, the obtained Li ion conductive compound was wet-pulverized, binder, solvent, and plasticizer and the like were added and then applied to a sufficient wet-mix to obtain slurry, in the same way as Example 1.

Then the slurry was molded into sheets, and the sheets were laminated to prepare a molded body in the same way as the samples of Examples 2~9. After the prepared molded body was cut into 1 cm square, sintered bodies of Examples 11~16 were obtained by varying the sintering time. Sintering was performed under atmospheric ambient. The highest temperature was 1000° C. The maintaining time was 10 hours in Example 11, 8 hours in Example 12, 6 hours in Example 13, 4 hours in Example 14, 3 hours in Example 15, and 2 hours in Example 16, respectively.

Then, electrodes were formed by Au sputtering in the same way as the samples of Examples 2~9, and then the dielectric relaxation frequencies were measured. Then the average particle numbers between the electrodes, the particle diameter D10s and the particle diameter D90s were calculated. The results were shown in table 2.

Comparative Example 3

Comparative Example 3 was prepared in the same way as the samples of Examples 11~16, but the maintaining time of sintering was 1 hour.

On the prepared sintered body, electrodes were formed by Au sputtering in the same way as the samples of Examples 11~16, and then the dielectric relaxation frequency was measured. Then the average particle number between the electrodes, the particle diameter D10 and the particle diameter D90 were calculated. The results were shown in table 2.

Table 2 showed the average particle numbers between the electrodes, the particle diameter D10s, the particle diameter D90s, and the dielectric relaxation frequencies of the samples of Examples 11~16 and Comparative Example 3.

TABLE 2

|  | Average particle number between the electrodes | Particle diameter D10 [μm] | Particle diameter D90 [μm] | Dielectric relaxation frequency [kHz] |
|---|---|---|---|---|
| Example 11 | 7.1 | 32.7 | 98.9 | 13.3 |
| Example 12 | 13.4 | 19.9 | 54.2 | 8.70 |
| Example 13 | 18.9 | 11.9 | 43.3 | 6.60 |
| Example 14 | 35.9 | 7.3 | 20.8 | 3.27 |
| Example 15 | 57.2 | 4.2 | 13.8 | 0.82 |
| Example 16 | 76.0 | 2.9 | 9.3 | 0.27 |
| Comparative Example 3 | 98.1 | 2.5 | 8.2 | 0.07 |

It could be known from table 2 that the less the average particle number between the electrodes was, the higher the dielectric relaxation frequency became. In Example 16, the dielectric relaxation frequency became higher than the glass-ceramics based solid electrolyte of Comparative Example 1 shown in table 1, because the average particle number between the electrodes was 80 or less. On the other hand, the average particle number between the electrodes of Comparative Example 3 was more than 80, and the dielectric relaxation frequency was lower than Comparative Example 1.

From the description above, it could be known that, for a Li ion conductive compound, in the case of $Li_{1.4}Ti_{1.6}Al_{0.4}(PO_4)_3$ with a NASICON-type crystal structure, the less the particle number between the electrodes was, the higher the dielectric relaxation frequency became, and the dielectric relaxation frequency could be higher than glass-ceramics based solid electrolyte if the average particle number between the electrodes was 80 or less, which was similar with that in the case of $Li_7La_3Zr_2O_{12}$ with a Garnet-type crystal structure.

As described above, the solid-state ion capacitors in the present invention can increase the dielectric relaxation frequency and thus can achieve a quicker charging and discharging rate. Therefore, as the applications similar to those of the electric double-layer capacitor, it has the possibility of substituting secondary batteries which were used for charging in a large current generated in a regenerative braking of EV or in a peak power generation of the solar power generation or wind power generation, in which the energy charging and discharging is required to be quicker than that in secondary batteries. Or the solid-state ion capacitors can be used in applications competitive with ceramic capacitors and electrolytic capacitors.

DESCRIPTION OF REFERENCE NUMERALS 1 solid-state ion capacitor
2 anode
3 cathode
4 solid electrolyte
5 line perpendicular to the electrodes connecting the electrodes on the opposite two sides
6 the intersection points of the solid electrolyte with the grain boundaries
7 length of the section separated by the intersection points with the grain boundaries
8 laminated type solid-state ion capacitor
9 outer packing
10 element body
11 the first outer electrode
12 the second outer electrode

What is claimed is:

1. A solid-state ion capacitor, comprising:
electrodes; and
a solid electrolyte sandwiched between the electrodes,
the solid comprising particles with a particle number of at least 1 and an average particle number of 2.1 or more and 80 or less in a thickness direction of the solid electrolyte, wherein the average particle number is calculated in a way that a perpendicular line connecting the electrodes on opposite ends of the solid is drawn in a cross section image of the solid-state ion capacitor, a particle number in the thickness direction is obtained by adding 1 to a number of intersection points of the perpendicular line with grain boundaries of the solid electrolyte, 10 perpendicular lines are arbitrarily drawn a same way, and an average of the 10 particle numbers obtained correspondingly is determined to be the average particle number sandwiched between the electrodes.

2. The solid-state ion capacitor according to claim 1, wherein,
said solid electrolyte comprises particles with D10~D90 in the particle diameters of the particle size distribution of 0.5 μm or more and 100 μm or less.

3. The solid-state ion capacitor according to claim 2, wherein,
said solid electrolyte contains lithium ion conductive compounds.

4. The solid-state ion capacitor according to claim 3, wherein,
said solid electrolyte and said electrodes were laminated alternately.

5. The solid-state ion capacitor according to claim 2, wherein,
said solid electrolyte contains lithium ion conductive compounds with Garnet type crystal structure, and the lithium ion conductive compounds contain at least Li, La, Zr and O.

6. The solid-state ion capacitor according to claim 5, wherein,
said solid electrolyte and said electrodes were laminated alternately.

7. The solid-state ion capacitor according to claim 2, wherein,
said solid electrolyte and said electrodes were laminated alternately.

8. The solid-state ion capacitor according to claim 1, wherein,
said solid electrolyte contains lithium ion conductive compounds.

9. The solid-state ion capacitor according to claim 8, wherein,
said solid electrolyte and said electrodes were laminated alternately.

10. The solid-state ion capacitor according to claim 1, wherein, said solid electrolyte contains lithium ion conductive compounds with Garnet type crystal structure, and the lithium ion conductive compounds contain at least Li, La, Zr and O.

11. The solid-state ion capacitor according to claim 10, wherein,
said solid electrolyte and said electrodes were laminated alternately.

12. The solid-state ion capacitor according to claim 1, wherein,
said solid electrolyte and said electrodes were laminated alternately.

* * * * *